Jan. 12, 1965

H. EPSTEIN 3,165,716

VEHICLE SIGNAL LAMP SYSTEM HAVING LOAD
SENSITIVE AUXILIARY FLASHER

Filed Aug. 7, 1963

INVENTOR.
HARRY EPSTEIN

BY *John P. Chandler*

HIS ATTORNEY.

United States Patent Office 3,165,716
Patented Jan. 12, 1965

1

3,165,716
VEHICLE SIGNAL LAMP SYSTEM HAVING LOAD SENSITIVE AUXILIARY FLASHER
Harry Epstein, Saddle Brook, N.J., assignor to Kleff Industries, Inc., New York, N.Y.
Filed Aug. 7, 1963, Ser. No. 300,564
9 Claims. (Cl. 340—81)

This invention relates to a vehicle signalling system for automobiles. It has particular reference to a signal circuit which can be added to the usual directional turn indicator circuit and make use of many of the circuit components usually provided in automobiles.

The present automobiles are supplied with signal lamps and include a flasher or circuit interrupter component which flashes the right or left signal lamps when a turn is indicated. Automobiles also are supplied with a stop light signal which is turned on when the brakes are applied. There is no provision, however, for special indicators which call attention to the fact that the stop light signal is operating. A few automobiles are also equipped with a back-up lamp which indicates the vehicle is moving in a reverse direction. However, there is no provision for special indicators which call attention to the fact that a car is parked along a highway in a disabled condition.

Commercial trucks are now required to use a hazard switch to switch on all four signal lamps when they are parked along the roadway for any reason. They are also required to carry signal flares. The present invention is for passenger cars and is designed to use all of the signal equipment generally supplied with these vehicles plus a few extra components which provide the desired flashing of all four lamps. The present invention includes the addition of an extra switch, an additional pilot lamp, and an additional flasher unit, but when these are installed, the driver may turn on the signal circuit and all four signal lamps will immediately start flashing to denote a disabled car or a car that is parked in line of traffic. The invention uses many components normally installed on automobiles and in addition provides a test circuit by which an operator may determine if the signal lamps, stop-light switch, wiring, voltage regulator, generator, and battery are in good operating condition.

One of the objects of the invention is to produce a distinctive signal when the vehicle is parked along a highway.

Another object of the invention is to attract attention of other drivers when help is needed.

Another object of the invention is to retain the usual directional signalling system for normal use when driving.

Another object of the invention is to test the condition of the vehicle battery, the generator, the signal lamps, the stop-light switch and wiring without leaving the driver's seat.

Another object of the invention is to test the operation of the stop-light switch each time the brakes are applied.

Another object of the invention is to avoid rear end collisions of cars parked on a highway.

The invention comprises a vehicle signalling system for use when the vehicle is disabled and includes the usual front and rear signal lamps which are generally used to indicate when the vehicle is about to turn. A source of electric power, such as a storage battery, is used to supply all the electric power necessary for operating the circuit. When the circuit is used, a first manually operated switching means connects the front lamps to the source of power in series with a second flasher component. A second switching means is coupled to the first and connects the rear lamps to the source of power in series with a first flasher unit. One feature of the invention includes the use of a pilot lamp on the dashboard to inform an operator of the vehicle that the circuits and lamps are in working order.

In the specification and claims the term, "flasher" is understood to apply to an automatic switch device which makes and breaks a circuit under control of a thermally actuated means. The flashers which have been used in the circuits described herein are well-known in the art and have been described in many issued patents. The flasher added to the circuit is specifically designed to be "load sensitive"; that is, its rate of flashing depends upon the amount of load connected to it and the current passing through it to the load. Most flasher units operating with a pull wire are within this class. The current through the pull wire heats it and it expands, permitting operation of electrical contacts. The flash rate of such a device is obviously responsive to the amount of current through the wire.

For a better understanding of the present invention, together with other and further objects thereof, reference is made to the following description taken in connection with the accompanying drawings.

Figure 1:
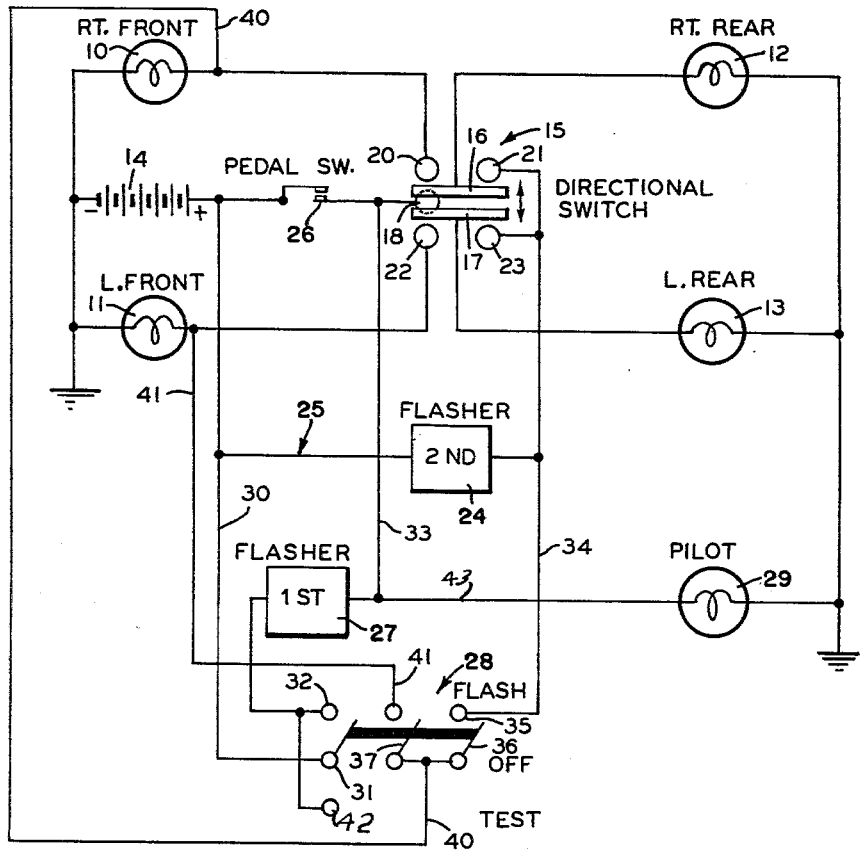
FIG. 1 is a schematic diagram of connections showing the circuit.

Referring now to FIG. 1, the vehicle is presumed to contain two front signal lamps 10 and 11 and two rear signal lamps 12 and 13. Electrical power for the operation of the circuit is obtained from a source of potential 14, which may be a storage battery supplemented by an automatic generator charging circuit (not shown in the drawing). Modern automobiles generally include a means for indicating the direction in which the automobile is about to turn and this circuit includes a directional switch 15 having two movable contact bars 16 and 17, a common contact point 18, and two pairs of switching contacts 20–21 and 22–23. An automatic flasher unit 24 is connected between the positive terminal of battery 14 and contact points 21 and 23. In most automobiles the ignition switch is connected into the circuit in series with conductor 25 at the point indicated so that when the ignition switch is turned to the "off" position, the flasher unit and its connected lamps are disconnected. The ignition switch has been omitted from the present circuit since it is contemplated that this circuit is to be used when the vehicle is parked and the motor is turned off. The usual automobile circuit also includes a normally open pair of contacts 26 which are closed when the brake pedal is depressed.

In order to add the additional safety features into the present vehicle signal system, an additional flasher unit 27 is added to the circuit. Also a three point, three position switch 28 and a pilot lamp are added to the circuit. The switch 28 is normally in the off position as indicated in the circuit diagram. However, if the switch blades are moved to the upper contacts, the added flasher 27 and pilot lamp 29 are connected to the circuit. In this position the four directional lamps 10, 11, 12 and 13 are connected to both flashers 24 and 27 to flash in unison. When switch 28 moves to the lower contacts, a test circuit is completed. The operation of this circuit and its importance will be discussed later.

When the automobile is operating properly and is moving, the directional switch 15 operates in the usual manner to switch intermittent power to the right signal lamps 10, 12, or to the left signal lamps 11, 13. If the car is turning to the right, the operator switches the directional switch so that the contact bar 16 is moved away from contact 18 and into electrical contact with points 20 and 21. In this connection the right signal lamps flash on and off at a predetermined rate because power is applied from battery 14, over conductor 25, through flasher 24, to both the right signal lamps 10 and 12. It should be noted that the left rear lamp 13 is still connected to contact point 18 so that it will light in case the brakes are applied and current is supplied through closed contacts 26. If a turn is made to the left, the operator turns the directional switch so that contact bars 16 and 17 are moved down as shown in the drawing and contact bar 17 is bridged across contact points 22 and 23. This action connects the left signal lamps 11 and 13 to flasher 24 and the source of potential 14. The above described circuit and action are common to most of the automobiles manufactured today.

When addition components are added to the circuit the operation is the same as described above as long as switch 28 is in the off position. If the automobile is disabled or for any other reason is parked on a highway, switch 28 is thrown to its upper position as seen in the figure and the following circuits are completed. A first flasher circuit may be traced from the positive terminal of battery 14, over conductor 30, to common terminal 31 in switch 28. The switch blade connects terminals 31 and 32 and supplies current to flasher 27. From the flasher terminal intermittent direct current is applied over conductor 33 to contact point 18, contact bars 16 and 17, and both the rear lamps 12 and 13 and then to the ground connection which is the negative terminal of the battery. This circuit is complete only when the directional switch is in its unoperated position and this portion of the circuit supplies only the two rear signal lamps and a pilot lamp 29 which may be mounted on the instrument panel in front of the operator.

The other two blades of switch 28 activate the two front lamps 10 and 11 by a supply circuit which may be traced as follows: from the positive terminal of battery 14, over conductor 25, to the second flasher 24 which interrupts the steady current flow and produces intermittent pulses. From flasher 24 the circuit continues over conductor 34 to switch terminal 35, switch blades 36 and 37, and conductors 40 and 41. Conductor 40 is connected to the right front signal lamp 10 while conductor 41 is connected to the left front signal lamp.

The above described circuit is sufficient to flash all the signal lamps, both front and rear, to give an indication that the car is disabled or that help is needed. An additional useful switching means has been provided which helps the operator make tests of his signal equipment. This is accomplished by moving the switch blades of switch 28 to "OFF" position so that only conductor 33 and pilot 29 are connected. Now, if the brake pedal is operated and switch 26 is operating, a steady glow is produced by the pilot lamp 29. If either the switch 26 or wiring are defective, the pilot lamp will not glow.

To test the lamps in the stop-light circuit, switch 28 is moved to the "TEST" position. If the pilot lamp 29 flashes on and off, the stop lamps 13 and 12 are both good. If the pilot lamp 29 produces a steady glow, then one or both stop lamps are defective.

This circuit may be traced as follow:

A first flasher circuit may be traced from the positive terminal of battery 14, over conductor 30, to common terminal 31 in switch 28. The switch blade connects terminals 31 and 42 and supplies current to flasher 27. From the flasher terminal, direct current is applied over conductor 33 to contact point 18, contact bars 16 and 17, and both the rear lamps 12 and 13 and then to the ground connection which is the negative terminal of the battery. From the flasher terminal, direct current is also applied over conductor 43 to pilot lamp 29 and then to the ground connection. If only one stop lamp is good then insufficient current will pass thrugh the "load sensitive" flasher 27 to permit the flasher to operate and, therefore, pilot lamp 29 will produce a steady glow. If both stop lamps 12 and 13 are good, then sufficient current will pass thru flasher 27 to permit the flasher to operate and thereby cause the two stop lamps 12 and 13 and also the pilot lamp 29 to flash on and off. In other words, the operator of the vehicle, without leaving the driver's seat, may determine whether or not the entire stop lamp circuit is operative by merely observing the illumination of pilot lamp 29.

It must be remembered that the first flasher 27 is load sensitive and will not flash unless both lamps 13 and 12 are good. This flasher 27 is also sensitive to battery voltage and will only flash normally at 120 flashes per minute if the battery voltage is normal. Therefore, the battery voltage, generator, and voltage regulator may also be tested by the above described circuit when switch 28 is in its "TEST" position. With the engine idling, the rate of flashing of the pilot lamp 29 indicates the condition of the battery. A fast rate, of about 120 flashes per minute, indicates a charged battery. Lower rates indicate lower battery voltage.

When the speed of the motor is increased, the flash rate should increase indicating that the generator is now charging the battery. No change in flash rate indicates that the generator and voltage regulator are functioning properly.

Figure 2:
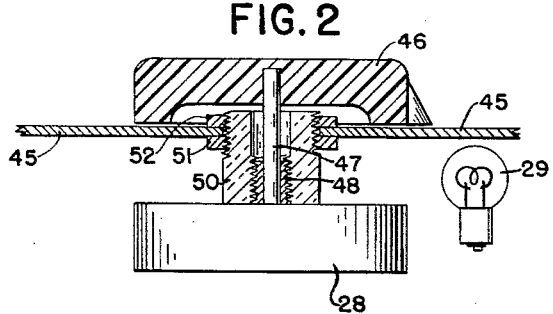
FIG. 2 is a cross sectional view of a switch with mounting means and illuminated knob.

The detailed view shown in FIG. 2 is an alternate means of indicating when the pilot lamp 29 is lighted. The lamp 29 is positioned behind an instrument panel 45 and close to the switch assembly 28. This switch is operated by a knob 46 which is made of transparent or semi-transparent plastic. The knob 46 is connected to the switch 28 by means of a shaft 47. The switch assembly 28 is provided with a threaded mounting lug 48 which is secured to a hollow cylindrical support 50 made of a transparent material such as styrene. This support is secured to the panel 45 by two lock nuts 51 and 52 or by any other convenient means.

When the lamp 29 is not lighted, the knob 46 is not illuminated. When the pilot lamp is lighted, light from its filament enters the transparent cylinder 50 and diffuses up to the semi-transparent knob 46 causing it to glow with a distinctive color. In this manner a separate pilot lamp lens and bezel are eliminated.

From the above description, it is obvious that the addition of a few electrical components added to the usual flasher circuit of an automobile increases its utility by a considerable extent. The resultant circuit produces a four lamp flasher means and a test circuit for determining the condition of many of the car's power units and the general condition of the electrical equipment.

The foregoing disclosure and drawings are merely illustrative of the principles of this invention and are not to be interpreted in a limiting sense. The only limitations are to be determined from the scope of the appended claims.

What I claim is:

1. In a vehicle signal system which includes front and rear signal lamps, a turn signal flasher, and a directional switch including a common terminal connectable to a power source through a normally open switch, said directional switch being operable to connect the rear signal lamps to the flasher when a turn is to be signalled; in combination therewith additional switching means for flashing all the lamps simultaneously including an additional flasher and a manually operable switch means which connects the additional flasher in series between one terminal of a source of electrical power and the common terminal in said directional switch, said switch means also connecting two of the signal lamps to one terminal of the turn signal flasher.

2. A vehicle signal system as claimed in claim 1 wherein an additional pilot lamp is positioned in view of the operator and connected in series with a source of potential and electrical contacts operated by a brake pedal, said pilot lamp indicating an operable stop light circuit when the brake pedal is depressed and the lamp produces a steady light.

3. A vehicle signal system as claimed in claim 1 wherein an additional pilot lamp is mounted in view of an operator, a current and voltage sensitive flasher having one terminal connected to said pilot and rear signal lamps, a manually operable test switch for connecting the flasher to a source of potential, whereby the flasher operates to send intermittent current pulses through the lamps, the rate of said pulses depending upon the battery voltage.

4. A vehicle test circuit as claimed in claim 3 wherein the rate of said pulses is also dependent upon the total lamp resistance of the rear lamps, said flasher adapted to stop its flashing operation when one lamp is burned out.

5. In a vehicle signal system which includes two front signal lamps, two rear signal lamps, a turn signal flasher and a directional switch including a common terminal connectable to a power source through a normally open switch, said directional switch being operable to connect two of the lamps to the flasher when a turn is to be signalled; in combination therewith additional switching means for flashing all the lamps simultaneously comprising an additional flasher, and a manually operable switch means which connects the additional flasher in series between one terminal of a direct current source of power and the common terminal in the directional switch, and which connects the two front signal lamps to one terminal of the turn signal flasher.

6. In a vehicle signal system which includes right and left front signal lamps, right and left rear signal lamps, a turn signal flasher, and a directional switch including a common terminal connectable to a power source through a normally open switch, said directional switch being operable to connect the right or left signal lamps when a turn is to be signalled; in combination therewith additional switching means for flashing all the lamps simultaneously comprising; an additional flasher, a manually operable switch means which connects the additional flasher in series between one terminal of a direct current source of power and the common terminal in the directional switch, said switch means also connecting the right and left front signal lamps to one terminal of the turn signal flasher.

7. A vehicle signal system as claimed in claim 6 wherein said switching means includes double movable switch blades in said directional switch and wherein said right and left rear signal lamps may be connected respectively to said double blades.

8. A vehicle signal system as claimed in claim 6 wherein an additional pilot lamp is connected between one side of the additional flasher and the negative terminal of the source of electrical power.

9. A vehicle signal system as claimed in claim 6 wherein a brake pedal switch is connected between one terminal of the source of electrical power and the common terminal in said directional switch, said pedal switch operating to light both rear signal lamps and short circuit the additional flasher.

References Cited by the Examiner
UNITED STATES PATENTS

| | | | |
|---|---|---|---|
| 2,514,604 | 7/50 | Hollins | 340—81 |
| 2,731,628 | 1/56 | Capanella | 340—81 |
| 2,747,174 | 5/56 | Hollins | 340—81 |
| 3,099,756 | 7/63 | Penfold et al. | 340—81 |

NEIL C. READ, *Primary Examiner.*